Sept. 4, 1951  R. H. VARIAN  2,566,386
FREQUENCY AND DIRECTION SELECTIVE HIGH-FREQUENCY
TRANSMISSION LINE APPARATUS
Filed Oct. 24, 1944
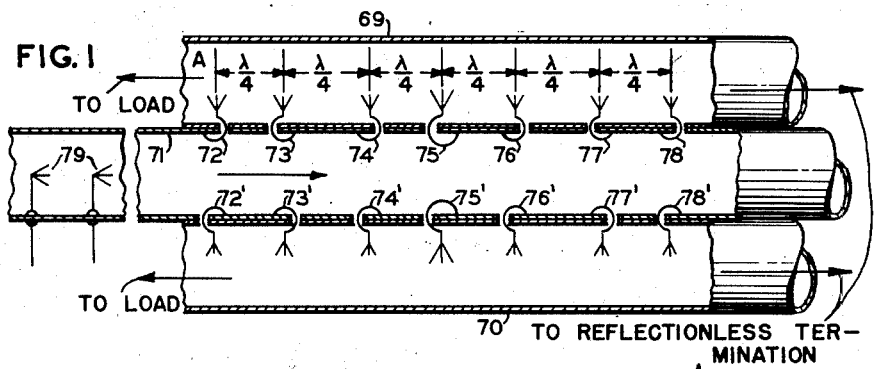
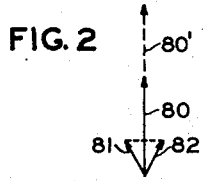
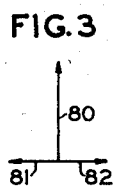
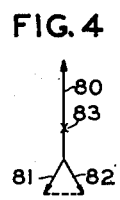
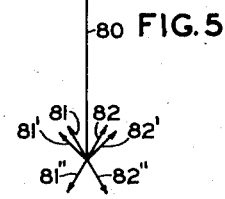
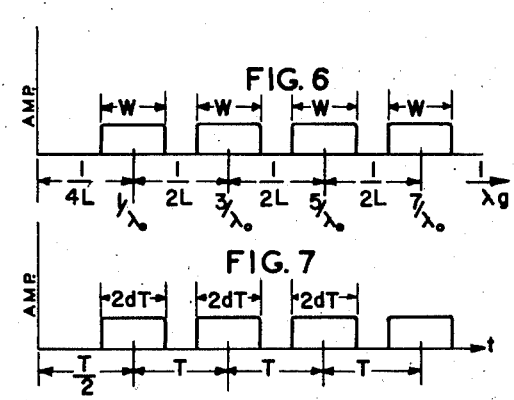
FIG. 8
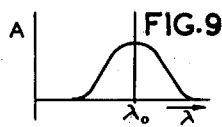
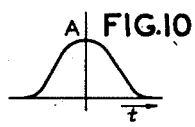
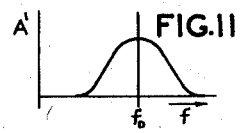
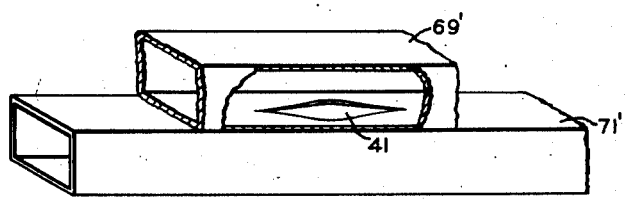
FIG. 12
INVENTOR
RUSSELL H. VARIAN
BY
ATTORNEY Patented Sept. 4, 1951

2,566,386

UNITED STATES PATENT OFFICE 2,566,386

FREQUENCY AND DIRECTION SELECTIVE HIGH-FREQUENCY TRANSMISSION LINE APPARATUS

Russell H. Varian, Garden City, N. Y., assignor to The Board of Trustees of The Leland Stanford Junior University, Stanford University, Calif., a corporation of California Application October 24, 1944, Serial No. 560,148

22 Claims. (Cl. 178—44)

This application is a continuation-in-part of copending application Serial No. 291,652, filed August 24, 1939, for Dielectric Guide Signaling, now Patent No. 2,375,223, granted May 8, 1945.

This invention relates, generally, to ultra high frequency signaling employing the propagation of electromagnetic waves through dielectric guides or hollow high frequency energy conductors, and the invention has reference, more particularly, to novel means for and methods of segregating or filtering electromagnetic energy in dielectric guides. By the term "dielectric guides" as used in the present specification is meant a system of material boundaries capable of guiding waves. Such devices have also been called "wave guides."

One object of the present invention is to provide novel equipment for launching electromagnetic waves in a dielectric guide for traversing the guide in one direction only, from any desired point along the guide, whether near or remote from the ends thereof, the said system of this invention operating independently of the mode of motion of the waves in the guide.

A further object of the present invention is to provide means for routing signals from one wave guide into and along different wave guides in accordance with the frequencies of the signals, said means serving as an electrical filter having any desired characteristic.

It is another object to provide a wave guide filter which may readily be designed to have any desired type of frequency transmitting characteristic.

Other objects and advantages will become apparent from the specification, taken in connection with the accompanying drawings wherein the invention is embodied in concrete form.

In the drawings,

Fig. 1 is a part sectional view of apparatus adapted for routing signals into differing guides in accordance with the frequency of the signals.

Figs. 2 to 5 are vector diagrams illustrating the operation of the apparatus of Fig. 1.

Figs. 6 to 8 are explanatory diagram explaining the operation of the device of Fig. 1.

Figs. 9 to 11 are further explanatory graphs illustrating a further use of the device of Fig. 1.

Fig. 12 is an elevation view partly in section of a modification of Fig. 1.

Similar characters of reference are used in all of the above figures to indicate corresponding parts.

Fig. 1 illustrates an apparatus for diverting signals of selected frequencies from a guide carrying a plurality of frequencies, the said signals being sent down guides communicating with the guide carrying the plurality of frequencies. This apparatus is also adapted for segregating one type of wave of a plurality of types traveling in a guide for propagation in another guide. In this figure, 71 is a dielectric guide in which waves of a number of different frequencies are adapted to travel in the direction from left to right as shown by the arrow, the source of these waves being symbolically represented by the transmitting means 79. The apparatus for conveying selected frequencies from the guide 71 to other guides such as adjoining guides 69 and 70, comprises a plurality of elements 72 to 78 and 72' to 78'. Each of these elements comprises a loop projecting into the guide 71 for linking the electromagnetic waves therein, which loops are connected through suitable openings provided in the guide wall to antennae located in the adjoining guide or guides, as 69 or 70, for radiating energy into these latter guides. Other forms of coupling between two wave guides may also be used, such as a rod antenna projecting into both guides, a pair of connected loops coupled respectively to the two guides, or mere unshielded openings between the guides.

The spacing of the coupling members 72 to 78 and 72' to 78' and the direction in which they link the flux in guide 71, the latter is also called the phasing thereof, are important in effecting the filtering operation. If guides 71, 69 and 70 are of the same size and shape, i. e., the same cross-sectional shape, then the wave length of any wave formed in guide 71 is the same wave length when traversing guides 69 and 70. By the term "wave length" is meant the separation of the closest points in the wave guide having the same phase of high frequency field alternation at the same instant. Also, if the elements 72 to 78 do not change the type of wave in transferring the energy from guide 71 to guide 69, for example, then but little energy will be propagated toward the right in guide 69 provided the successive energy transferring elements 72 to 78 are disposed so as to transfer energy in opposite phases, as illustrated in Fig. 1. The reason for this is that any wave propagated toward the right from any element, such as 72, will always meet destructive interference from the next element to the right, such as 73, since 73 is connected in phase opposition to 72. This will be apparent when it is noted that a traveling wave crest in guide 71, on reaching 72 and 72', will cause energy to be transferred to guides 69 and 70, thereby initiating a crest in these guides traversing the same from left to right, and this crest will move on to element 73 or 73', as the case may be, in the same time that the crest in guide 71 moves to these elements 73 and 73'; but since elements 73 and 73' are connected in phase opposition to the connection of 72 and 72', the former will produce a trough in guides 69 and 70 when the crest reaches these points, thereby effecting the substantial cancelling of the crest arriving from 72 and 72'. The same process of substantial cancellation will continue all along the line.

Should the elements 72 to 78 be arranged to deliver energy from 71 to 69 in the same phase relationship at each of the elements instead of in the opposite phase relationship, then all of the fields of all the radiators 72 to 78 would add up from left to right and a large signal would be propagated in that direction along guide 69 regardless of the spacing of the elements 72 to 78. Since elements 74', 75' and 76' are shown arranged for transferring energy in the same phase, there will be some wave propagation toward the right in guide 70.

The spacing and phasing of these elements is important in frequency selection and propagation of waves along guides 69 and 70 in the transmission of these waves along these guides from right to left. This will be apparent when it is noted that the time it takes for the crest traveling in guide 71 to pass from element 72 to 73 and be repropagated in guide 69 and then pass from 73 to 72 is an important element determining whether or not the crest from 73 will reach 72 at the instant that 72 is emitting a crest. In other words, the distance between 72 and 73 is the criterion for determining whether or not the wave will travel from right to left in guide 69 or be cancelled. Of course this distance will have to vary with the frequency transmitted, so that for a different spacing of 72 and 73 a different frequency will be propagated along guide 69 from right to left.

The arrangement shown in Fig. 1 therefore constitutes a frequency discriminating filter for radiation transferred from guide 71 to guides 69 and 70 for propagation from right to left in these latter guides. This filter is capable of producing either multiple pass bands and stop bands or single pass bands and stop bands. A convenient manner of showing that this statement is true is to demonstrate that the above arrangement or device may be subjected to an analysis that is similar to that which may be used for the analysis of the well known modulated carrier frequency, except that instead of having to deal with phase of the side band frequencies relative to the carrier frequency as a function of time, we deal with the phase of the waves coming from the elements 72 to 78, for example, relative to the phase in a particular element, as a function of wave length of the waves in guides 71 and 69.

Considering the simple graphical representation of the phase relations existing between a carrier and two side band frequencies, it will be noted that these two side band frequencies are equally spaced in frequency from the carrier frequency and on opposite sides of it. One side band will progressively gain in phase with respect to the carrier since its frequency is higher, as the other loses in phase with respect to the carrier by a corresponding amount since its frequency is correspondingly lower. Hence the phase conditions existing at any instant may be illustrated by three concurrent vectors 80, 81, and 82, such as shown in Figs. 2 to 4, in which the lengths of the vectors represent the amplitude of the frequency components to which they correspond, and the angle relative to the standard carrier frequency represents the phase of that frequency component relative to the standard or carrier frequency at a particular instant of time. The amplitude of the resultant wave at that instant of time may be found by adding the projections of the vectors representing the side band frequencies on the vector representing the carrier frequency together with this main vector representing the carrier frequency.

In Fig. 2, for example, the solid line 80 represents the amplitude of the standard or carrier frequency and the solid lines 81 and 82 represent the amplitude of the frequency components on opposite sides thereof, lines 81 and 82 of course corresponding to the side band frequencies. In Fig. 2 these three frequency components are of the same sign, i. e., extending in approximately the same direction although they are not quite in phase. The vector addition of 80, 81 and 82 in Fig. 2 produces the resultant consisting of solid line 80 plus dotted line 80'.

In Fig. 3 conditions are represented as of an instant later, at which time the side band amplitudes are of opposite phase and hence cancel out.

Fig. 4 shows the same three components at a still later instant, the projections of the vectors representing the two side band components on the line of the carrier frequency vector being shown by the dotted lines from the heads of the arrows, and the amplitude of the resultant wave at that particular instant of time being shown by the distance of the cross 83 from the point of origin of the vectors.

Fig. 5 illustrates a case in which a number of side band frequencies are present instead of only two, as shown in the previous figures. The rate at which the side band frequencies shift their phase with respect to the carrier frequency is clearly proportional to the difference between the particular side band frequency and that of the carrier. Therefore, Fig. 5 may be easily visualized in motion with a number of pairs of vectors rotating about an axis with different speeds, each pair consisting of one vector turning in an opposite direction from its complementary vector and at a speed equal thereto, the vectors of any pair moving into alignment with each other at the same time that they become aligned with the carrier vector in the case of pure amplitude modulation. Thus, these diagrams represent accurately the conditions existing in pure amplitude modulation of a carrier.

A carrier of course may be modulated with any desired wave form, as, for instance, that shown in Fig. 8. It can be shown mathematically, as is well known to those skilled in the art, that any modulated wave form is identically equal to a constant carrier frequency plus certain side band frequencies such as those illustrated in Fig. 5, all of which have their amplitudes as well as their frequencies determined by the envelope of the wave.

It will be noted, of course, that Figs. 2 to 5 represent the phases of a carrier and side bands at particular instants of time. A complete series of such figures would represent the phases of all of the components of the modulated waves as a function of time.

Referring now again to Fig. 1, we are at liberty to choose any one of the elements 72 to 78 as a standard of phase and compare the phases of the waves emitted from the remaining elements traveling from right to left in guide 69 to the phases of the waves emitted by the element chosen as the standard of phase, this comparison being made at some fixed point in guide 69. Elements 74 and 76 are relatively equally spaced with respect to element 75 so that the additional time required for waves emitted from the transmitting means 79 to reach a designated point such as A in guide 69 to the left of element 75 by way of element 76, over that required for the waves to reach that point when passing through 75, is equal to the decrease in time taken for such waves to reach the designated point when passing through element 74 over that required when passing through 75. Fig. 2 may now represent these three waves. Thus, vector 80 represents the wave at the designated point A, which entered guide 69 by way of element 75. Vector 81 represents the wave at that point A, which entered by way of element 74, which leads vector 80 in phase, since, because of the shorter path, less time is required for this wave to reach the designated point; and vector 82 represents the wave at point A entering by way of element 76, which correspondingly lags vector 80 since more time is necessary for this wave to reach the designated point A.

Figs. 3 and 4 now represent the same quantities for different frequencies of energy flowing in guide 71, since the relative phase shifts between the vectors 80, 81, 82 will change with frequency, because the path differences (measured in wavelengths) vary with change in frequency. At some particular wave length of the waves in guide 71, the waves emitted from a pair of energy transferring elements such as 74 and 76 or 73 and 77 will be simultaneously in phase with each other and with the waves from 75 in their passage down guide 69. This will take place when the time interval required for the wave to travel in guide 71 from coupling element 74 to element 75, through element 75 to guide 69, and in guide 69 to element 74, totals an integral number of periods of the input wave. For this condition, maximum wave energy transmission will occur in the guide 69 from right to left at desired frequencies.

Fig. 5 accurately represents the phase relations of the various waves transferred by the elements 72 to 78 at a particular wave length of the waves in the guide. The vertical vector 80 now represents the wave transferred from guide 71 to guide 69 by the standard energy transferring means 75, and the other pairs of arrows 81, 82; 81', 82'; and 81'', 82'' represent the phases of the waves transferred by the various pairs of transferring elements, such as 74—76, 73—77 and 72—78.

Since the several vectors of Fig. 5 represent the phase relations of the various components of the energy transferred from guide 71 to guide 69 and propagated along this guide from right to left, it will be seen that if the frequency generated by source 79 is steadily changed, the phase relations of the various components of the transferred energy referred to above will go through the same relationships as a function of the reciprocal of wave guide wave length in guides 69 and 70 as side band components go through as a function of time. Therefore, the resultant leftward propagation in guide 69 will vary with the reciprocal of wave guide wave length in the same manner that the amplitude of an amplitude modulated wave varies with time.

It is therefore possible with the apparatus shown in Fig. 1, to produce any arbitrarily chosen bands of large and small amplitude of transmission as a function of the reciprocal of wave guide wave length in the guides, corresponding to the large and small "bands" of amplitude as a function of time which may be produced by modulation of a carrier. Since the wave length of the waves in the guides 69 and 71 is a function of the frequency, although not necessarily a linear function, the bands referred to are also a function of frequency. Thus, in other words, the device shown in Fig. 1 constitutes a filter which may be altered to produce any arbitrarily chosen pass bands.

This may be best understood from an illustrative example. Suppose it is desired to transmit leftward in guide 69 only wavelengths in pass bands of width W centered at $$\frac{1}{\lambda_0},\frac{3}{\lambda_0},\frac{5}{\lambda_0},\frac{7}{\lambda_0}$$

etc. and having the frequency characteristic as shown in Fig. 6. If the same wave form is plotted against time, as in Fig. 7, it is seen to be a periodic pulse wave, which may be expressed analytically in the form:

$$A=2d+\frac{2}{\pi}\sum_{n=1}^{\infty}(-1)^n\frac{\sin 2\pi nd}{n}\cos\left(\frac{2\pi nt}{T}\right) \quad (1)$$

where $n$ is the order of harmonic components of the pulse wave and may assume positive integral values; T is the recurrence interval between successive pulses; $t$ is the independent variable time; and $2d$ is the ratio of bandwidth to T.

The corresponding equation of the desired wave energy satisfying Fig. 6 may be expressed analytically as follows:

$$A=2WL+\frac{2}{\pi}\sum_{n=1}^{\infty}(-1)^n\frac{\sin 2\pi nWL}{n}\cos 2\pi n\frac{2L}{\lambda_g}$$

$$(1a)$$

where W is bandwidth;

$$\frac{1}{2L}$$

is the recurrence interval between successive pulses; $n$ is an integer that assumes positive values; and $\lambda_g$ is the independent variable wave guide wavelength. A comparison of the cosine arguments of Equations 1 and 1a illustrates that the independent variable $t$ for the carrier equation corresponds to the independent variable $$\frac{1}{\lambda_g}$$

for the coupler equation.

The center guide wavelengths of the pass bands of Fig. 6 may be expressed in terms of L and $n$ as follows:

$$\lambda n=\frac{4L}{2n+1}$$

If the carrier is modulated by the wave of Equation 1, as shown in Fig. 8, so as to come to zero value at intervals and then rise from this value, forming the square wave form shown and never reversing in phase, the equivalent frequency spectrum in such case consists of a relatively strong carrier frequency of constant amplitude plus weaker side band frequencies also of constant amplitude. Its instantaneous amplitude is given by:

$$A = 2d \cos 2\pi ft + \frac{2}{\pi}\sum_{n=1}^{\infty}(-1)^n \frac{\sin 2\pi nd}{n} \left\{\cos\left[2\pi\left(f+\frac{n}{T}\right)t\right] + \cos\left[2\pi\left(f-\frac{n}{T}\right)t\right]\right\} \quad (2)$$

Equation 2 indicates a carrier component of amplitude ($2d$) and an infinite sequence of pairs of side band components differing in frequency from the carrier frequency by $$\frac{n}{T}$$

cycles per second and having amplitude $$\frac{2}{\pi}\frac{\sin 2\pi nd}{n}$$

where $n$ may take on any positive integer value. In practice, large values of $n$ may be ignored, since they produce very low sideband amplitudes.

In accordance with the analysis given above, each pair of sideband components in Equation 2 represents a pair of couplings between guides 69 and 71, equally spaced with respect to a datum coupling representing the carrier frequency. The spacing of the coupling elements is determined by the center wave length $\lambda_0$ of the lowest frequency band it is desired to transfer, where $\lambda_0$ is derived from the aforesaid formula $$\lambda n = \frac{4L}{2n+1} \text{ with } n=0$$

The spacing should then be $\frac{1}{4}$ $\lambda_0$ where $\lambda_0$ of course is measured in the guides 69 and 71. The guides 69 and 71 are assumed to have the same propagation modes and propagation velocities producing equal wave lengths measured in the guides.

The amplitudes of the several components of Equation 2 determine the amplitude of energy transfer by their respectively corresponding coupling elements. Any desired transfer amplitude can be obtained by suitably designing the coupling coefficient between the guides, as by selecting the area of coupling loops, or the amount of projection of rod antennas, or the area of openings between the guides. Where a negative sign occurs in the expression for the sideband amplitude, the coupling should be reversed in polarity, which may be most readily performed by reversing the sense of that coupling loop, as in Fig. 1.

In this way, the methods of Fourier series analysis may be used to derive the spacings of the various transferring elements to obtain repeating bands of any desired shape. Non-repeating bands may also be obtained by using energy transferring means that are so spaced that the Fourier integral will approximate the band or bands desired. Of course, in theory there should be an infinite number of transferring elements infinitely closely spaced to produce the desired Fourier integral, but actually it is only necessary to have a reasonable finite number to obtain a satisfactory approximation.

This also may be shown by an example. Suppose the wavelength pass-band is as shown in Fig. 9, represented by the function $$A = \epsilon^{-\pi\left(\frac{1}{\lambda}-\frac{1}{\lambda_0}\right)^2}$$

The Corresponding modulation envelope is $A = \epsilon^{-\pi t^2}$, shown in Fig. 10. Since this envelope represents a single discontinuous pulse, and not a periodic function, it cannot be represented in a Fourier series as in the preceding example. However, the frequency spectrum for such a function is shown by its Fourier integral $$\int_{-\infty}^{\infty} \epsilon^{j2\pi(f-f_0)t} \epsilon^{-\pi t^2} dt = \epsilon^{-\pi(f-f_0)^2}$$

shown in Fig. 11. As will be seen from this Fig. 11, discrete sideband frequencies no longer appear, but there is a continuous frequency spectrum.

Accordingly, discrete spaced couplings are no longer suitable. For the continuous frequency spectrum, it is necessary to provide a substantially continuous coupling, having at each point a coupling coefficient or energy transfer amplitude determined by the ordinate of Fig. 11 corresponding to the frequency representing that point. This can be obtained by using a continuous slot between the guides 69 and 71, having varying width corresponding to the amplitude of the frequency characteristic of Fig. 11. Such a structure is illustrated in Fig. 12.

The continuous coupling can also be obtained practically by a series of separate but closely spaced couplings of the proper transfer amplitude.

It has been assumed in the foregoing that the wave lengths in guides 69 and 71 are the same. Such being the case, if the elements 72 to 78 were all connected in the same phase relation, then a large percentage of the energy would be transferred along guide 69 toward the right, but in the illustration shown in Fig. 1, these elements are alternately connected in opposite phase so that very little energy travels to the right in guide 69. This condition would of course be disturbed if the guides were made of different cross-sectional area, but there will still be a band pass effect from right to left in guide 69, though the transmission characteristics in the direction from left to right in this guide becomes somewhat complicated and may exhibit band pass characteristics. Since the left-right transmission is not used, it may be absorbed in any suitable reflection-less termination.

It has been assumed in the above that the spacing of the elements 72 to 78 is such that any pair of wave components, such, for example, as those emitted from elements 74 and 76 into guide 69, come into phase with each other in the guide 69 at the same wave length at which they come into phase with the component emitted from element 75. This of course makes the analogy to an amplitude modulated carrier complete and renders it relatively easy to calculate a filter, but it is not intended to be understood that this condition must be fulfilled in order to obtain filter action.

Thus, it is possible to cause only signals having a certain predetermined wave length to be transmitted along guide 69 from right to left. Since the wave length in the dielectric guide depends upon the type of wave propagated as well as upon its frequency, then it follows that if a radiating element in the guide generates more than one type of wave at its oscillating frequency, only that wave will be propagated having a wave length suitable for transmission in the guide. The devices shown in Fig. 1 may therefore serve as a sharply selective means for transmitting only a given type or mode of wave motion in the guide.

If the elements 72', 73', 74', 76', 77', 78' were to have their phases reversed with respect to the corresponding unprimed elements associated with guide 69 as shown in Fig. 1, then in that case the transmission of energy into guide 70 will take place at times when 72 to 78 pass little or no energy to guide 69. Thus, if a series of bands of strong and of zero transmission are obtained as in Fig. 8, guide 70 will transmit a band when guide 69 does not, and vice versa, so that the device of Fig. 1 then becomes a switching means which switches one series of frequency bands into guide 69 and the intervening bands into guide 70.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a signalling system, a pair of similar dielectric guides adapted to contain travelling electromagnetic waves therein, one of said guides being arranged to convey signals of differing frequencies, said guides being contiguous for a portion of their lengths, means for effecting frequency-selective wave energy propagation in the other of said guides in a predetermined direction of flow and for transferring wave energy between said guides comprising a series of mutually spaced energy-transferring means located at said contiguous portion along the path of said travelling waves, the mutual spacing of said energy-transferring means being less than one wavelength within the guides at a predetermined desired frequency and the electrical sense of coupling for certain energy transferring means in one of said guides with respect to said transferred wave energy being out of phase with reference to the remaining energy-transferring means, whereby, said transferred wave energy is at least partially additive in said predetermined direction of flow for predetermined frequencies along said other guide and at least partially suppressed for the reverse direction of flow.

2. A signalling system comprising a pair of similar dielectric guides contiguous for a portion of their lengths and adapted to propagate travelling waves therealong, means for exciting travelling electromagnetic waves along one of said guides, and a series of mutually spaced energy-transferring means located at said contiguous portion in the path of said traveling waves for electromagnetically coupling wave energy between said guides, said energy transferring means being positioned along said guides substantially one-quarter wavelength apart at a predetermined frequency of operation, and certain of said energy transferring means being relatively reversed in phase with respect to the remaining ones to provide in the other of said guides at least partial reenforcement of the coupled wave energy at desired frequencies in a predetermined direction of propagation.

3. In a signalling system, a pair of similar dielectric guides, one of said guides being a receiving guide arranged to convey signals having a predetermined frequency characteristic, said guides being contiguous for a portion of their lengths, and a series of mutually spaced energy-transferring means located at said contiguous portion for transferring energy between said guides, the mutual spacing of said energy-transferring means being substantially an odd multiple of a quarter wavelength apart at a predetermined frequency of operation, certain of said energy transferring means being arranged out of phase with the remainder for waves transferred and the coupling coefficients of said energy transferring means being determined by said predetermined frequency characteristic, whereby the transferred signal is at least partially additive in a predetermined direction of flow for predetermined frequencies along the receiving guide and at least partially suppressed in the reverse direction.

4. In a signalling system for affording selective wave energy propagation of a predetermined frequency characteristic, a plurality of dielectric guides, said guides being adjacent one another for a part of their lengths, means energizing one of said guides with a travelling wave, and energy transferring elements coupling said one guide to another of said guides, successive ones of said elements being relatively out of phase and mutually spaced apart substantially an odd multiple of a quarter wavelength at a predetermined frequency of operation and for suppressing at least partially wave propagation of said transferred signals in a predetermined direction in one of said guides, said elements being arranged so as to provide one central transferring element and additional pairs of transferring elements, the elements of any pair being located at opposite sides of said central element, said elements of any pair being in phase with each other and being out of phase with said central element, the relative coupling coefficient amplitudes of said elements being proportional to correlated amplitude components of said frequency characteristic, so that frequency and directional selective wave energy propagation is afforded in another of said guides.

5. In a signalling system, a pair of dielectric guides, said guides being contiguous for a portion of their lengths, means for supplying waves of a number of different frequencies to one of said guides for passage therealong in one direction, and a plurality of mutually spaced energy transfer elements dispersed along said one guide, said elements having loops projecting into said one guide, said elements also extending into the other of said guides for radiating energy thereinto of selected frequencies, the spacing of said transfer elements determining the frequencies passed thereby, said loops being so oriented as to reverse the phase of the transferred signal at each successive transfer element whereby propagation of the transferred waves in one direction in the second guide is substantially cancelled for all frequencies, whereas the propagation of the transferred waves in the opposite direction is a function of the frequency of such transferred waves.

6. High frequency apparatus comprising a pair of adjacent wave guides, a first coupling between said guides for transferring high frequency energy from a first guide of said pair to the second guide, and a second phase-reversing coupling spaced along said guides from said first coupling for transferring further high frequency energy between said guides with a 180° phase shift with respect to the energy coupled into the second guide by said first coupling, whereby, in response to energy flow in one of said guides in a predetermined direction, a wave will be excited in the other of said guides travelling in only a single direction.

7. High frequency apparatus comprising a first wave guide adapted to have high frequency travelling electro-magnetic waves propagated therein, a second similar wave guide, a first coupling between a first point of said first wave guide and a first point of said second wave guide for exciting a first wave in said second wave guide at said first point thereof, and means including a second coupling between a second point of said first wave guide and a second point of said second wave guide for exciting said second wave guide with a second wave at the second point thereof having a phase difference with respect to said first wave equal to the sum of 180° and the phase shift experienced by said travelling wave in said first wave guide in travelling between the first and second points of said first wave guide.

8. High frequency apparatus comprising a pair of adjacent high frequency energy conductors and means for exchanging high frequency energy between said conductors and for exciting in one of said pair of conductors high frequency wave energy having a predetermined frequency characteristic, comprising a plurality of spaced coupling means for transferring high frequency energy between said conductors, said coupling means having coupling coefficients determined by the amplitude coefficients of a Fourier transformation of said characteristic.

9. High frequency apparatus comprising a pair of adjacent wave guides and means for exchanging high frequency energy between said guides and for exciting in the receiving guide of said guides high frequency wave energy of a predetermined frequency characteristic having recurrent pass-bands, comprising a plurality of spaced coupling means for transferring said energy between said guides, said coupling means being spaced apart substantially one-quarter the guide wavelength in said guides at substantially the center frequency of the lowest pass-band of said characteristic.

10. Apparatus as in claim 9 wherein said coupling means have coupling coefficients corresponding to the amplitude coefficients of the Fourier transformation of said characteristic.

11. High frequency apparatus for converting a variable frequency wave to a variable amplitude wave, comprising a source of variable frequency waves, means including a first wave guide coupled to said source for propagating said wave in said guide as a travelling wave, a second wave guide coupled to said first guide, and a plurality of spaced coupling means arranged along said guides for transferring said travelling wave energy from said first to said second guides, the mutual spacing of said coupling means and the coupling coefficients thereof being determined respectively by the phase and amplitude of a Fourier transformation of said amplitude wave whereby said variable frequency wave is converted into a correspondingly amplitude-varied wave.

12. High frequency apparatus comprising a first wave guide, a source of high frequency energy coupled to said guide, a pair of further wave guides adjacent said first guide, corresponding series of spaced coupling means coupling said first guide to each of said further guides, said series of spaced coupling means each having a predetermined one in said first guide coupled in like phase with respect to the wave energy supported by said first guide, and the remainder of said coupling means taken in corresponding pairs having opposite phase of energy transfer, said corresponding pairs of coupling means having coupling coefficients determined by the Fourier transformation of the desired frequency bands in one of said further guides, whereby said two further guides are responsive to different frequency bands.

13. Apparatus as in claim 12, further comprising means for periodically varying the frequency of said source, whereby said energy is alternately switched to said further guides.

14. A signalling system comprising a pair of similar dielectric wave guides contiguous for a portion of their lengths and adapted to propagate respective travelling waves therealong, means for propagating travelling electromagnetic waves along one of said guides, means for transferring energy to the other of said guides and for suppressing at least partially wave energy propagation in one direction of flow in said other guide including a series of mutually spaced energy-transferring means at said contiguous portion along the path of said latter travelling wave, the phasing of certain of said energy-transferring means with respect to the wave energy transferred being arranged out of phase with respect to the remainder, and the spacing of said energy transferring means being less than one wavelength of said waves within said guides said phasing and said spacing also being selected to provide at least partial addition of transferred wave energy in said other guide in a reverse direction with respect to the above-mentioned direction of suppression.

15. Ultra-high-frequency apparatus comprising an elongated wave guide, a plurality of coupling means distributed along said guide, and a plurality of radiating means coupled respectively to said coupling means, said coupling means being spaced more closely than a wavelength in the guide at the operating frequency thereof, wherein alternate ones of said radiating and coupling means are arranged to produce a 180° phase shift of the waves radiated by said radiating means with respect to the waves radiated by intermediate radiating means.

16. High frequency apparatus comprising a first wave guide adapted to have a high frequency travelling electromagnetic wave propagated therein, a pair of further wave guides adjacent said first guide, corresponding series of spaced coupling means coupling said first guide to each of said further guides, said series of spaced coupling means each having a predetermined one in said first wave guide coupled in like phase with respect to the wave energy supported by said first guide and the remainder of said coupling means taken in corresponding paired ones having opposite phases of energy transfer, and said corresponding paired ones of said coupling means having coupling coefficients determined by the Fourier transformation of the desired frequency bands in one of said further guides, whereby said two further guides are responsive to different frequency bands.

17. High frequency apparatus comprising a first wave guide adapted to have a high frequency travelling electromagnetic wave propagated therein, a further wave guide adjacent said first guide, and a plurality of spaced coupling means coupling said first guide to said further guide, successive ones of said coupling means having opposite phases of energy transfer whereby propagation of waves in said further wave guide is restricted to a single direction.

18. High frequency apparatus comprising a radio frequency transmission line, an energy-utilization device, first means for coupling wave energy between said line and said utilization device, and second means for coupling electromagnetic wave energy between said line and said utilization device, said first and second coupling means being in phase opposition, said first and second means being spaced apart along said line substantially an odd multiple of a quarter wavelength at a predetermined frequency of operation.

19. High frequency apparatus comprising a radio frequency transmission line, a utilization device, aperiodic means providing wave energy coupling between said line and said device, and further aperiodic means providing reversed wave energy coupling between said line and said device, said first and second means being spaced apart along said line substantially an odd multiple of a quarter wavelength at a predetermined frequency of operation.

20. High frequency apparatus responsive to travelling waves on a first radio frequency transmission line, including a second transmission line, a load coupled to said second line, first means providing coupling between said lines, second means providing coupling between said lines, said first and second line intercoupling means being in phase opposition, and all of said coupling means cooperating to provide waves in said load responsive to the magnitude of waves travelling substantially in a single direction along said first line.

21. High frequency apparatus responsive to travelling waves on a first radio frequency transmission line, including a second transmission line, a load coupled to said second line, first means providing aperiodic inductive coupling between said lines, second means providing aperiodic inductive coupling betwen said lines, said first and second line intercoupling means being in phase opposition and all of said coupling means cooperating to provide an output to said load responsive to the magnitude of waves travelling substantially in a single direction along said first line.

22. Apparatus responsive to travelling waves on a first radio frequency transmission line, including a second transmission line, a load coupled to said second line, first means substantially only capacitively coupled to one of said lines and aperiodically inductively coupled to the other of said lines, second means substantially only capacitively coupled to one of said lines and aperiodically inductively coupled to the other of said lines, said first and said second means providing couplings between said lines substantially in relative phase opposition and all of said couplings cooperating to provide excitation of said load responsive to the magnitude of waves travelling substantially in a single direction along said first line.

RUSSELL H. VARIAN.

REFERENCES CITED

The following references are of record in the file of this patent:

UNITED STATES PATENTS

| Number | Name | Date |
|---|---|---|
| 2,153,728 | Southworth | Apr. 11, 1939 |
| 2,206,923 | Southworth | July 9, 1940 |
| 2,241,119 | Dallenbach | May 6, 1941 |
| 2,250,308 | Lindenblad | July 22, 1941 |
| 2,261,130 | Applegate | Nov. 4, 1941 |
| 2,311,520 | Clifford | Feb. 16, 1943 |